Patented Nov. 1, 1938

2,135,454

UNITED STATES PATENT OFFICE 2,135,454

CATALYST PREPARATION

Ambrose McAlevy, Wilmington, Del., assignor to E. I. du Pont de Nemours & Company, Wilmington, Del., a corporation of Delaware No Drawing. Application October 26, 1935, Serial No. 46,876

6 Claims. (Cl. 23—88)

This invention relates to an improved process for the preparation of catalysts and more particularly to the preparation of catalysts from halogen acids and boric acids.

An object of the present invention is to provide an improved process for the preparation of highly active catalysts or condensing agents which are particularly useful for accelerating many organic reactions. Another object of the invention is to provide a process for the preparation of highly active catalysts from halogen acids and boric acids or borates. A still further object of the invention is to provide a process for the preparation of boron halide catalysts containing water. Another object of the invention is to provide a process wherein liquid anhydrous hydrofluoric acid is combined with orthoboric acid to form a compound or mixture corresponding to a trihydrate of boron trifluoride. Other objects and advantages of the invention will hereinafter appear.

The objects of the invention are realized by interacting a halogen acid (preferably a liquid halogen acid) with a boric acid. When the more volatile halogen acids which include hydrofluoric, hydrochloric and hydrobromic acids are used, it is usually desirable to provide sufficient cooling in order that appreciable quantities of the volatile acids are not lost. The reaction is preferably conducted in a pressure-sustaining, acid-resisting vessel having suitable cooling coils for maintaining the proper temperature throughout the reaction.

Alternatively catalysts of excellent utility may be prepared by the interaction of the boric acids, polyborates, or metal borates with halogen acids in the presence of concentrated mineral acids and more particularly sulfuric acid. As a result of these reactions there are produced both solid and liquid products which are not as easily handled as the products resulting from the reactions in the absence of mineral acids. These products are, nevertheless, highly efficient for many reactions.

The halogen acids which may be used include hydrofluoric, hydrochloric, hydrobromic and hydriodic acids which may be reacted with any of the boric acids, such, for example, as metaboric acid, $H_2B_2O_4$, orthoboric acid, $H_3BO_3$, and in general the polyboric acids and polyborates such as dihydrodiboric, hexahydrotetraboric, dihydrotetraboric and the higher polyboric acids which are mixtures of two or more mols of orthoboric acid, $H_3BO_3$, less one or more mols of water. The alkali and alkaline earth metal borates as well as boric anhydride, $B_2O_3$, may also be used.

The temperature at which the reaction may be effected between hydrogen fluoride and boric acids ranges from —92° C. to decomposition temperature (usually about 200° C.) of the product but the reaction proceeds with sufficient rapidity at the preferred temperature range between 0.0–10° C.

As a result of the reaction there is obtained a product which is a boron halide combined with water as a complex, hydrate or perhaps as a mere solution. For example, when one mol of solid orthoboric acid is reacted with three mols of liquid hydrofluoric acid there is formed a liquid which, by analysis, contains one mol of boron trifluoride and three mols of water. When one-half a mol of metaboric acid is reacted with three mols of liquid hydrofluoric acid there is formed a compound which apparently contains one mol of boron trifluoride to two mols of water. Whether the water is combined with the boron trifluoride as a hydrate, or in some other form, or whether the ratio of water to boron fluoride can be expressed in whole numbers, is not material to the present invention for the product whatever its theoretical or actual chemical structure is an excellent catalyst for a number of organic reactions.

The organic synthesis which may be catalyzed by the compounds herein described include generally organic reactions wherein catalysts of an acidic nature are required. Such reactions include, for example, the preparation of aliphatic acids by the interaction of carbon monoxide with aliphatic alcohols, the preparation of aliphatic acids from olefines and carbon monoxide, the preparation of aliphatic esters by the interaction of aliphatic ethers with carbon monoxide, the preparation of formals from olefines and aldehydes, the preparation of esters from olefines and acids, the preparation of phenyl ethers from phenols and olefines and similar types of organic synthesis, a number of other reactions for which my catalysts are active are described in the co-pending application of D. J. Loder, Serial No. 46,875 filed Oct. 26, 1935.

Examples will now be given illustrating the various methods of preparing and using the catalysts of the invention but it will be understood that the details therein given shall not limit the scope of the invention.

*Example 1.*—1643 parts of liquid hydrofluoric acid are charged into a pressure-resisting, acid-resisting autoclave with 1696 parts of orthoboric acid. The mixture is cooled to about 10° C. to prevent the loss of hydrogen fluoride. There results a mobile liquid product which has the empirical formula $BF_3.3H_2O$ and a specific gravity of 1.500 at 20° C.

Example 2.—2520 parts of metaboric acid are added to 3464 parts of hydrofluoric acid in a pressure-resisting, acid-resisting autoclave. At the beginning of the process a temperature of approximately 10° is maintained, the temperature being permitted to rise toward the end of the reaction to about 80° C. The reaction is allowed to proceed at this higher temperature until complete and a mobile liquid is produced which has the empirical formula $BF_3.2H_2O$.

Example 3.—Into a pressure-resisting autoclave containing 100 parts by weight of methanol is introduced 80 parts of the catalyst obtained in accord with the process of Example 1. To the resulting mixture carbon monoxide is added until a pressure of 700 atmospheres is attained. The temperature is held at approximately 250° C., and the reaction continued until analysis shows that an equivalent molal weight of CO has been absorbed per mol of methanol present. The pressure is released, the temperature of the reaction mass cooled and the crude product distilled. Some methyl acetate appears during the first part of the distillation, then aqueous acetic acid distills over and simultaneously with the withdrawal of water through distillation, water, as such, or as steam, is added to the crude at substantially the same rate. The reaction mixture yields 24% of methyl acetate and 45% of acetic acid.

Example 4.—Ethanol may be reacted under conditions given in Example 3, but with a catalyst made in accordance with Example 2. The yield, after decomposition with water is 50-55% of the amount of propionic acid theoretically obtainable according to the equation

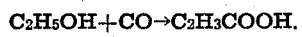

$$C_2H_5OH + CO \rightarrow C_2H_5COOH.$$

Example 5.—1500 parts by weight of boron fluoride trihydrate, made according to Example 1, is mixed with 417 parts of anhydrous boron fluoride. The product obtained has the empirical formula of a dihydrate of boron fluoride, which has a specific gravity 1.625 at 20° C.

Example 6.—Into a copper still pot, 8 inches in diameter and 12 inches deep (inside dimensions), is placed 2450 grams of liquid hydrogen fluoride. To this is slowly added, while keeping the vessel surrounded by ice, 1800 grams of $B_2O_3$. A viscous liquid is formed to which is added an equal volume of concentrated sulfuric acid. The resulting composite product is an excellent catalyst.

The examples illustrate methods of preparing the boron halide catalysts by interaction between the liquid halogen acid and the solid boric acid. Other methods for bringing about this reaction may also be employed, such as absorbing the halogen acid in the vapor phase directly by the boric acid or borate, but because of the simplicity of the procedures of the examples I prefer to conduct the process by the methods therein shown.

From the consideration of the above specification it will be realized that many changes may be made in the invention therein disclosed without departing from its scope or sacrificing any of its advantages.

I claim:

1. In a process for the preparation of hydrated boron trifluoride catalysts the steps of interacting, in a closed vessel, liquid anhydrous hydrofluoric acid with a compound selected from the group consisting of boric acid, boric anhydride, and a borate at temperature below 10° C. in such proportions that the sum of the reactants adds up to one empirical formula of the group consisting of $BF_3.2H_2O$ and $BF_3.3H_2O$.

2. In a process for the preparation of a catalyst having substantially the empirical formula $BF_3.2H_2O$ the steps which comprise interacting, in a closed vessel, approximately 3 mols of liquid anhydrous hydrofluoric acid with approximately one-half of a mol of metaboric acid, the interaction being effected at temperatures below 10° C.

3. In a process for the preparation of a catalyst having substantially the empirical formula $BF_3.3H_2O$ the steps which comprise interacting, in a closed vessel, approximately 3 mols of liquid anhydrous hydrofluoric acid with approximately 1 mol of orthoboric acid, the interaction being effected at temperatures below 10° C.

4. In a process for the preparation of a catalyst conforming to the empirical formula $BF_3.3H_2O$ the steps which comprise mixing approximately 1696 parts by weight of soild orthoboric acid with approximately 1643 parts by weight of liquid anydrous hydrofluoric acid in a closed vessel and effecting the reaction at a temperature of from —92 to 200° C.

5. In a process for the preparation of a catalyst conforming to the empirical formula $BF_3.2H_2O$ the steps which comprise interacting approximately 2530 parts by weight of metaboric acid with approximately 3463 parts by weight of liquid anhydrous hydrofluoric acid in a closed vessel at a temperature below 10° C. at the beginning of the process.

6. In a process for the preparation of a catalyst conforming to the empirical formula $BF_3.2H_2O$ the steps which comprise interacting approximately 1643 parts of liquid anhydrous hydrofluoric acid with approximately 1696 parts of orthoboric acid in a closed vessel, and adding to approximately 1500 parts of the resulting mixture approximately 417 parts of anhydrous boron fluoride at a temperature below 10° C.

AMBROSE McALEVY.